(12) United States Patent
Chamberlain et al.

(10) Patent No.: US 11,153,227 B1
(45) Date of Patent: Oct. 19, 2021

(54) MANAGING COMMUNICATION BETWEEN MICROSERVICES

(71) Applicant: International Business Machines Corporation, Armonk, NY (US)

(72) Inventors: Richard Chamberlain, Southampton (GB); Adam John Pilkington, Eastleigh (GB); Howard Hellyer, Kings Worthy (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/985,265

(22) Filed: Aug. 5, 2020

(51) Int. Cl.
*H04L 12/24* (2006.01)
*H04L 29/08* (2006.01)
*H04L 12/923* (2013.01)
*G06F 9/54* (2006.01)
*H04L 12/26* (2006.01)

(52) U.S. Cl.
CPC ............ *H04L 47/762* (2013.01); *G06F 9/547* (2013.01); *H04L 41/0816* (2013.01); *H04L 43/08* (2013.01); *H04L 67/02* (2013.01); *H04L 67/10* (2013.01)

(58) Field of Classification Search
USPC .......................................... 709/221
See application file for complete search history.

(56) References Cited

U.S. PATENT DOCUMENTS

| | | | |
|---|---|---|---|
| 9,716,617 B1* | 7/2017 | Ahuja | H04L 63/0227 |
| 10,382,257 B2 | 8/2019 | Nassar | |
| 2018/0089011 A1* | 3/2018 | Basiri | G06F 9/5077 |
| 2018/0136931 A1 | 5/2018 | Hendrich | |
| 2018/0331905 A1* | 11/2018 | Toledo | H04L 43/0882 |
| 2019/0102157 A1 | 4/2019 | Caldato | |
| 2020/0242237 A1* | 7/2020 | Simpson | H04L 63/1425 |
| 2020/0296172 A1* | 9/2020 | Gunjal | G06F 9/5061 |
| 2020/0351286 A1* | 11/2020 | Ahuja | H04L 69/16 |
| 2020/0364128 A1* | 11/2020 | Vittal | G06F 9/45558 |
| 2020/0366580 A1* | 11/2020 | Sinha | H04L 43/0852 |
| 2020/0366752 A1* | 11/2020 | White | H04L 67/327 |
| 2020/0366756 A1* | 11/2020 | Vittal | H04L 67/36 |

* cited by examiner

*Primary Examiner* — Jude Jean Gilles
(74) *Attorney, Agent, or Firm* — Brian M. Restauro (57) ABSTRACT

Embodiments of the present invention provide methods, computer program products, and systems. One example comprises monitoring traffic between a plurality of microservices to determine a property of the traffic. Embodiments of the present invention can then, based on the determined property of the monitored traffic, relocate each of the plurality of microservices from its respective origin resource to a shared resource.

20 Claims, 6 Drawing Sheets

MANAGING COMMUNICATION BETWEEN MICROSERVICES

BACKGROUND

The present invention relates generally to communication between microservices, and more particularly to managing communication between a plurality of microservices.

Traditional microservices are a software development technique, specifically a variant of the service-oriented architecture (SOA) structural style, that arranges an application as a collection of services. Thus, microservices (or microservice architecture) use a cloud-native architectural approach in which a single application is composed of many loosely coupled and independently deployable smaller components, or services. These services typically have their own stack, inclusive of the database and data model and communicate with one another over a combination of representational state transfer application programming interfaces (REST APIs), event streaming, and message brokers. The services are also typically organized by business capability, with a line separating services often referred to as a bounded context.

Microservices deployed in cloud environments typically use cloud APIs to communicate between each other. These APIs are typically implemented by way of a REST call, such as a HyperText Transfer Protocol (HTTP) REST call. For a simple REST function, most of the processing required to service that function includes marshalling, transmitting and unmarshalling of a request used to make the API call. Marshalling refers to the process of transforming a memory representation of an object to a data format suitable for storage or transmission, and it is typically used when data must be moved between different parts of a computer program/service or from one program/service to another. Unmarshalling refers to unpacking the data format by transforming the data format back into a memory representation.

Servicing the function may also include encrypting and decrypting the API calls as they are made over the network. As a result, the majority of the processing performed to make an HTTP REST function call is performed by way of excess and/or indirect computation time, memory, bandwidth, or other resources that are required to perform the task (i.e. computing overhead), instead of using application logic.

Cloud applications may use node (i.e. a worker machine in a cloud environment) affinity to minimize network traffic, by constraining which nodes a pod (i.e. an object representing a set of running containers in a cluster) is eligible to be scheduled on, based on labels associated with the node. However, the overhead of marshalling and unmarshalling data to and from HTTP messages remains. Additionally, security requirements of an organization may require HTTP traffic travelling through the network to be encrypted as HyperText Transfer Protocol Secure (HTTPS), which further increases the required processing overhead

SUMMARY

The present invention seeks to provide a computer-implemented method for managing communication between a plurality of microservices.

The present invention further seeks to provide a computer program product including computer program code for implementing a proposed method when executed by a processing unit.

The present invention also seeks to provide a processing system adapted to execute this computer program code.

The present invention also seeks to provide a system for managing communication between a plurality of microservices.

According to an aspect of the present invention, there is provided a computer-implemented method. The method comprises monitoring traffic between a plurality of microservices to determine a property of the traffic. The method then comprises, based on the determined property of the monitored traffic, relocating each of the plurality of microservices from its respective origin resource to a shared resource.

According to yet another aspect of the invention, there is provided a computer system. The system comprises a monitoring unit configured to monitor traffic between a plurality of microservices to determine a property of the traffic. The system further comprises a relocating unit configured to, based on the determined property of the monitored traffic, relocate each of the plurality of microservices from its respective origin resource to a shared resource.

According to another aspect of the invention, there is provided a computer program product. The computer program product comprises a computer readable storage medium having program instructions embodied therewith, the program instructions executable by a processing unit to cause the processing unit to perform a method according to a proposed embodiment.

According to another aspect of the invention, there is provided a processing system comprising at least one processor and the computer program product according to an embodiment. The at least one processor is adapted to execute the computer program code of said computer program product

BRIEF DESCRIPTION OF THE DRAWINGS

Preferred embodiments of the present invention will now be described, by way of example only, with reference to the following drawings, in which:

FIGS. 5A-5E are simplified block diagrams of examples of communication between a plurality of microservices, in accordance with an embodiment of the present invention.

DETAILED DESCRIPTION

It should be understood that the Figures are merely schematic and are not drawn to scale. It should also be understood that the same reference numerals are used throughout the Figures to indicate the same or similar parts.

In the context of the present application, where embodiments of the present invention constitute a method, it should be understood that such a method may be a process for execution by a computer, i.e. may be a computer-implementable method. The various steps of the method may therefore reflect various parts of a computer program, e.g. various parts of one or more algorithms.

Also, in the context of the present application, a system may be a single device or a collection of distributed devices that are adapted to execute one or more embodiments of the methods of the present invention. For instance, a system may be a personal computer (PC), a server or a collection of PCs and/or servers connected via a network such as a local area network, the Internet and so on to cooperatively execute at least one embodiment of the methods of the present invention.

Concepts for managing communication between a plurality of microservices are proposed. Such concepts may enable optimizing microservices by way of manipulation of autonomous load-responsive transport and topology. Accordingly, embodiments may facilitate dynamical reduction of processing overhead for communication between a plurality of microservices based on an actual performance of an application, instead of requiring application changes. Embodiments may further facilitate automatic migration of microservices around a cluster.

Such concepts may involve a concept of bringing microservices "down" and "up" (i.e. shutting down and restarting the microservices) while reconfiguring the microservices. The microservices may use a common API for communicating between themselves, which may be reconfigured based on the network traffic travelling between the microservices. By reconfiguring the microservices, communication may be exchanged between communication by way of HyperText Transfer Protocol Secure (HTTPS), HyperText Transfer Protocol (HTTP), inter-process communication, and direct function calls.

Embodiments may be implemented in conjunction with an API layer for abstracting function calls between services, a monitoring service (i.e. a monitoring unit) that monitors traffic made over generated APIs, and a composition service (i.e. a relocating unit) that brings services "down" and "up" while reconfiguring how the services communicate. The API layer may be generated by way of documentation comprising an interface specification in another high level specification language. The generated API layer may comprise a plurality of APIs, and may be used to call between services. The generated APIs may automatically report usage (i.e. traffic) to the monitoring service.

Embodiments may further be implemented in conjunction with a concept of generating REST calls by way of the API layer and analyzing the resulting traffic between services in a distributed microservices environment running inside a cloud environment. If a significant amount of traffic travelling between the services is identified, the microservices may be reconfigured by shutting down and starting up (or scaling down and up) the microservices nearer to each other.

Proposed embodiments may employ a concept of adapting services to use a specifically generated API layer, instead of direct REST calls. As a result, the generated API layer may change how API calls are made. Relocating services to the same machine may remove the processes of encryption and decryption from communication. Relocating services to the same container may change communication to inter-process calls. Relocating services to the same process may change communication to plain functions calls. In each case, the services may be treated as "black boxes", such that the requirement for specific information about each service is reduced.

Embodiments of the present invention recognize that information from messages being sent between microservices can be obtained and then used to redistribute each of the microservices (e.g. by reducing the distance required for the communication between them). Embodiments of the present invention may therefore bring these microservices closer together by moving them from their original resources (i.e. origin resources) to a resource shared by the microservices (i.e. a shared resource). By sharing a resource, embodiments of the present invention can reduce the complexity of communication between the microservices may base on the information obtained from the communication. As such, information that does not require complex methods of communication between the microservices can be sent by way of a simpler distribution technique by bringing the microservices closer together.

Proposed embodiments may further employ a concept of moving two or more containers into a shared pod and/or moving two or more microservices into a shared container for using inter-process communication instead of using a network when the two or more microservices interact frequently.

In a proposed embodiment, relocating each of the plurality of microservices may comprise, for each of the plurality of microservices, restarting the microservice at the shared resource and shutting down the microservice at its origin resource. In this way, the plurality of microservices may be brought nearer to each other, such that the resource used by each of the plurality of microservices may be shared across all of the plurality of microservices. Consequently, this may reduce the processing overhead required for communication between the plurality of microservices, which may improve the efficiency in the communication.

In some embodiments, relocating each of the plurality of microservices may comprise reconfiguring communication between the plurality of microservices by collecting the plurality of microservices from each of their respective origin resources to a shared resource. In this way, communication may be reconfigured to reduce the processing overhead related to a microservice invoking a function of another microservice of the plurality of microservices.

In a proposed embodiment, the property of the monitored traffic may comprise at least one of an amount of data moving between the plurality of microservices, a type of the data moving between the plurality of microservices, and a flow rate of the data moving between the plurality of microservices. In this way, the scope of the variety of properties of the monitored traffic that may be used to determine whether to relocate each of the plurality of microservices may be increased. As a result, the efficacy and reliability of relocating each of the plurality of microservices based on the determined property of the monitored traffic may be improved, as the information regarding the monitored traffic used as a basis for relocating each of the plurality of microservices may be enhanced.

In some embodiments, at least one of the origin resource and the shared resource may comprise a virtual resource. In this way, the microservices may be located within a cloud environment, which may improve availability and ease of recovery in a case of a software failure. This may further enable improved centralization of management of the microservices and improved compatibility between applications. Additionally, this may reduce personnel costs, power, and cooling by using less physical equipment, as well as improve utilization of hardware, by reducing hardware sharing by virtual machines to idle equipment.

In some embodiments, the virtual resource may comprise one of a node, a pod of a node, a container, a container of a pod, a process, and a process of a container. In this way, communication between the plurality of microservices may be reconfigured by relocating the plurality of microservices closer together. The variety of virtual resources used by each of the plurality of microservices may represent a series of abstractions with reduced latency as the plurality of microservices move closer together. By relocating the plurality of microservices from separate origin resources to shared virtual resources, the amount of processing overhead required for communication between the microservices may be reduced.

In some embodiments, relocating each of the plurality of microservices may comprise determining if the property of the monitored traffic satisfies a predetermined requirement. The step may further comprise, responsive to the property of the monitored traffic satisfying the predetermined requirement, relocating each of the plurality of microservices from its respective origin resource to the shared resource. In this way, the ease of control of relocating each of the plurality of microservices may be improved. Consequently, the efficiency and reliability of relocating each of the plurality of microservices from its respective origin resource to the shared resource may be increased.

In some embodiments, the predetermined requirement may comprise at least one of an amount of data being greater than or equal to a predetermined threshold, a type of the data being a predetermined type, and a flow rate of the data being greater than or equal to a predetermined threshold. In this way, the scope of the variety of predetermined requirements used to determine whether to relocate each of the plurality of microservices may be increased. As a result, the efficacy and reliability of relocating each of the plurality of microservices based on the determined property of the monitored traffic may be improved.

In a proposed embodiment, monitoring traffic between the plurality of microservices may comprise receiving requests communicated between the plurality of microservices, then monitoring traffic associated with the received requests. In this way, the traffic between the plurality of microservices may be monitored based on the received requests communicated between the plurality of microservices. This may enable collecting information required for monitoring the traffic to be collected directly from the source of the traffic (i.e. the requests communicated between the plurality of microservices). Consequently, the reliability and efficiency of monitoring the traffic may be improved.

In some embodiments, relocating each of the plurality of microservices may comprise, for each of the plurality of microservices, maintaining a first instance of the microservice at its origin resource, restarting a second instance of the microservice at the shared resource, and shutting down the second instance of the microservice at its origin resource. In this way, each of the plurality of microservices may be relocated temporarily instead of permanently or requiring further relocation to return the microservice to its origin resource. Additionally, each of the plurality of microservices may be relocated with respect to an interaction (i.e. communication) with a first microservice without affecting an interaction with a second microservice. As a result, this may reduce the time and processing required for relocating each of the plurality of microservices, therefore the efficiency of relocating each of the plurality of microservices may be improved.

Figure 1:
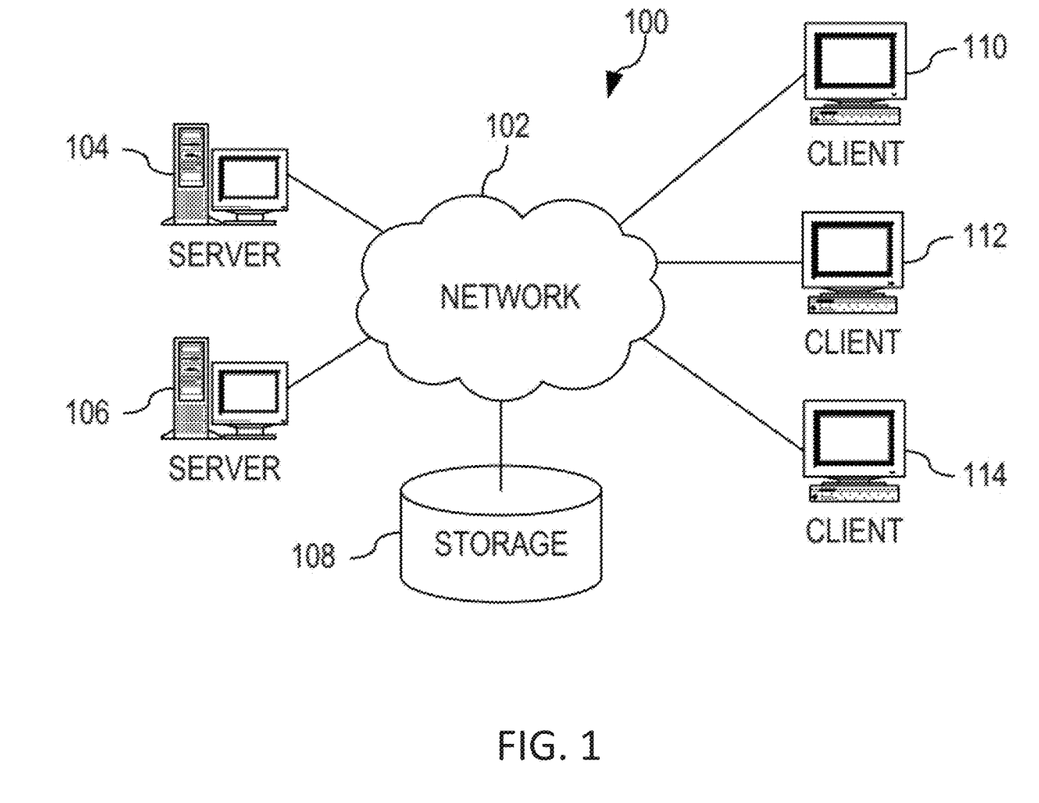
FIG. 1 depicts a pictorial representation of an example distributed system, in accordance with an embodiment of the present invention.

FIG. 1 depicts a pictorial representation of an exemplary distributed system in which aspects of the illustrative embodiments may be implemented. Distributed system 100 may include a network of computers in which aspects of the illustrative embodiments may be implemented. The distributed system 100 contains at least one network 102, which is the medium used to provide communication links between various devices and computers connected together within the distributed data processing system 100. The network 102 may include connections, such as wire, wireless communication links, or fiber optic cables.

In the depicted example, a first 104 and second 106 servers are connected to the network 102 along with a storage unit 108. In addition, clients 110, 112, and 114 are also connected to the network 102. The clients 110, 112, and 114 may be, for example, personal computers, network computers, or the like. In the depicted example, the first server 104 provides data, such as boot files, operating system images, and applications to the clients 110, 112, and 114. Clients 110, 112, and 114 are clients to the first server 104 in the depicted example. The distributed processing system 100 may include additional servers, clients, and other devices not shown.

In the depicted example, the distributed system 100 is the Internet with the network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, the distributed system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

Figure 2:
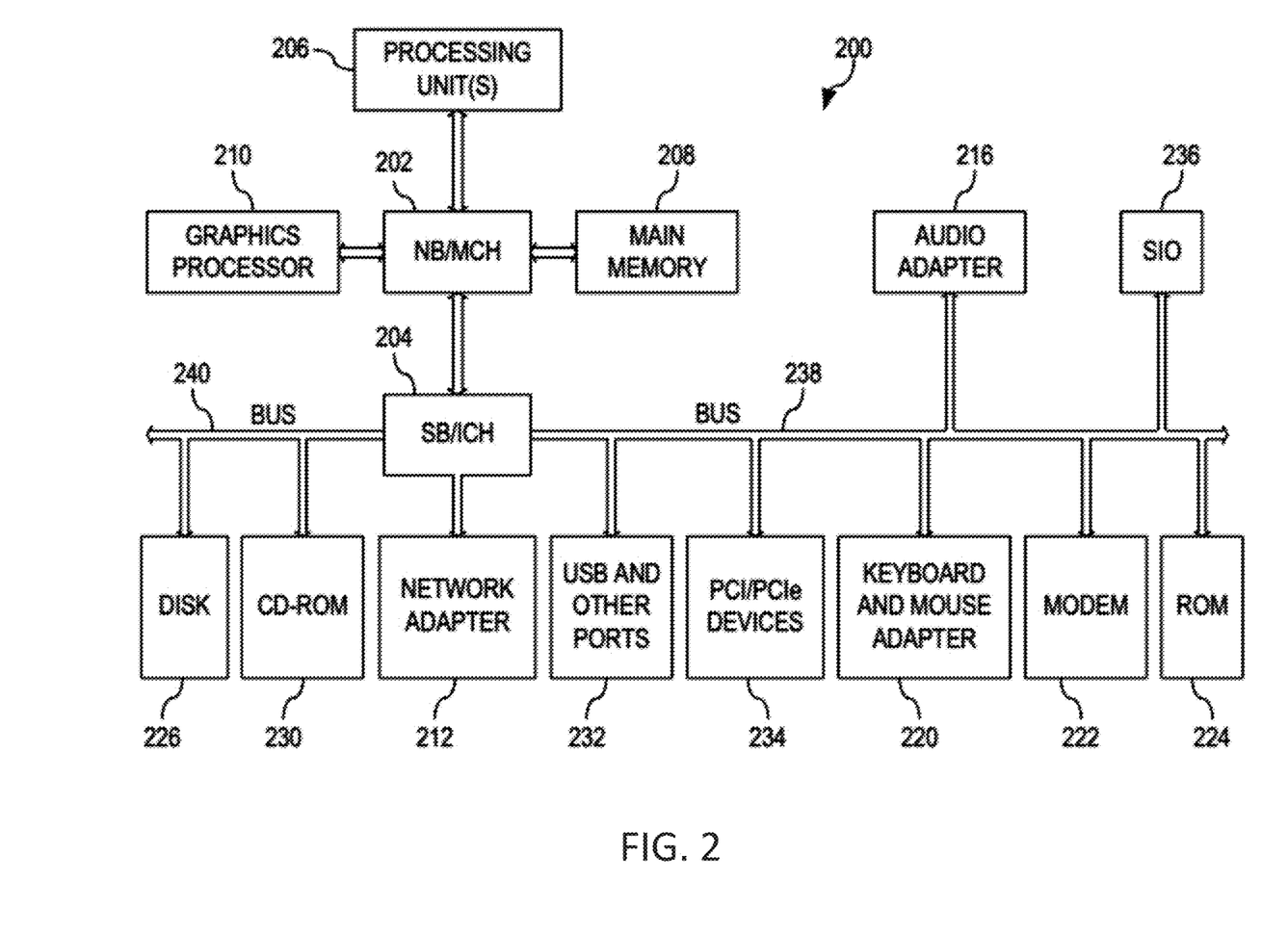
FIG. 2 is a block diagram of an example system in which aspects of the illustrative embodiments may be implemented, in accordance with an embodiment of the present invention.

FIG. 2 is a block diagram of an example system 200 in which aspects of the illustrative embodiments may be implemented. The system 200 is an example of a computer, such as client 110 in FIG. 1, in which computer usable code or instructions implementing the processes for illustrative embodiments of the present invention may be located. For instance, the system 200 may be configured to implement a monitoring unit, and a relocating unit according to an embodiment.

In the depicted example, the system 200 employs a hub architecture including a north bridge and memory controller hub (NB/MCH) 202 and a south bridge and input/output (I/O) controller hub (SB/ICH) 204. A processing unit 206, a main memory 208, and a graphics processor 210 are connected to NB/MCH 202. The graphics processor 210 may be connected to the NB/MCH 202 through an accelerated graphics port (AGP).

In the depicted example, a local area network (LAN) adapter 212 connects to SB/ICH 204. An audio adapter 216, a keyboard and a mouse adapter 220, a modem 222, a read only memory (ROM) 224, a hard disk drive (HDD) 226, a CD-ROM drive 230, a universal serial bus (USB) ports and other communication ports 232, and PCI/PCIe devices 234 connect to the SB/ICH 204 through first bus 238 and second bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

The HDD 226 and CD-ROM drive 230 connect to the SB/ICH 204 through second bus 240. The HDD 226 and CD-ROM drive 230 may use, for example, an integrated drive electronics (IDE) or a serial advanced technology attachment (SATA) interface. Super I/O (SIO) device 236 may be connected to SB/ICH 204.

An operating system runs on the processing unit 206. The operating system coordinates and provides control of various components within the system 200 in FIG. 2. As a client, the operating system may be a commercially available operating system. An object-oriented programming system, such as the Java™ programming system, may run in conjunction with the operating system and provides calls to the operating system from Java™ programs or applications executing on system 200.

As a server, system 200 may be, for example, an IBM® eServer™ System P® computer system, running the Advanced Interactive Executive (AIX®) operating system or the LINUX® operating system. The system 200 may be a symmetric multiprocessor (SMP) system including a plurality of processors in processing unit 206. Alternatively, a single processor system may be employed.

Instructions for the operating system, the programming system, and applications or programs are located on storage devices, such as HDD 226, and may be loaded into main memory 208 for execution by processing unit 206. Similarly, one or more message processing programs according to an embodiment may be adapted to be stored by the storage devices and/or the main memory 208.

The processes for illustrative embodiments of the present invention may be performed by processing unit 206 using computer usable program code, which may be located in a memory such as, for example, main memory 208, ROM 224, or in one or more peripheral devices 226 and 230.

A bus system, such as first bus 238 or second bus 240 as shown in FIG. 2, may comprise one or more buses. Of course, the bus system may be implemented using any type of communication fabric or architecture that provides for a transfer of data between different components or devices attached to the fabric or architecture. A communication unit, such as the modem 222 or the network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the system mentioned previously, without departing from the spirit and scope of the present invention.

Moreover, the system 200 may take the form of any of a number of different data processing systems including client computing devices, server computing devices, a tablet computer, laptop computer, telephone or other communication device, a personal digital assistant (PDA), or the like. In some illustrative examples, the system 200 may be a portable computing device that is configured with flash memory to provide non-volatile memory for storing operating system files and/or user-generated data, for example. Thus, the system 200 may essentially be any known or later-developed data processing system without architectural limitation.

Figure 3:
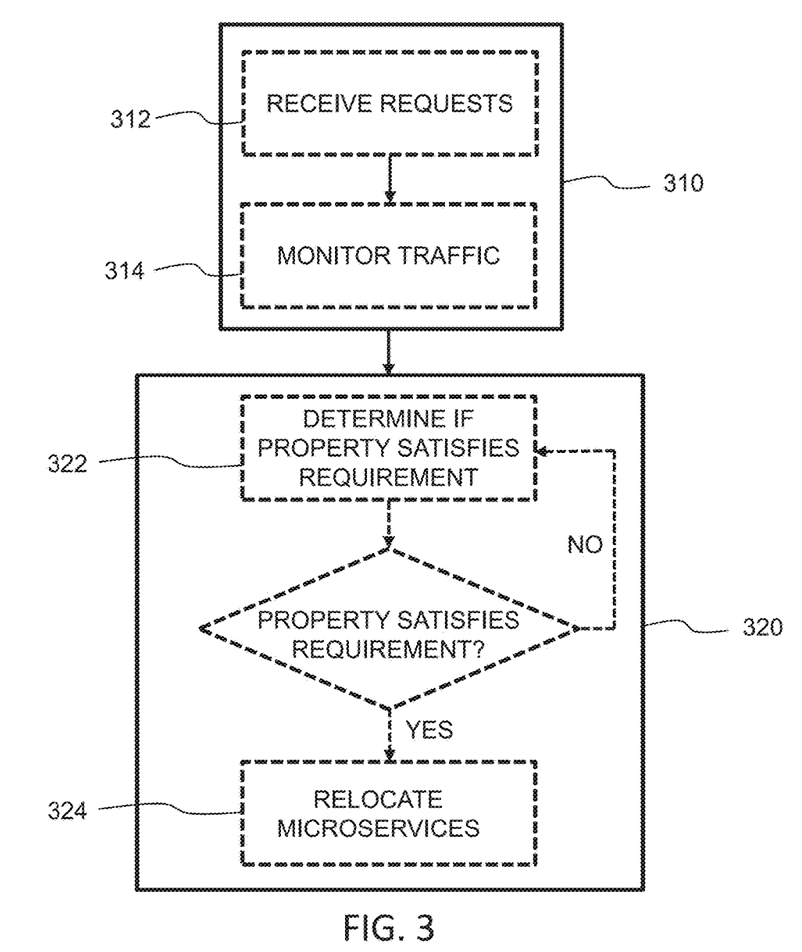
FIG. 3 is a flow diagram of a computer-implemented method for managing communication between a plurality of microservices, in accordance with an embodiment of the present invention.

Referring now to FIG. 3, there is depicted a flow diagram of a computer-implemented method for managing communication between a plurality of microservices.

Step 310 comprises monitoring traffic between a plurality of microservices to determine a property of the traffic.

Here, step 310 comprises step 312 and 314. Step 312 comprises receiving requests communicated between the plurality of microservices. Step 314 comprises monitoring traffic associated with the received requests.

Specifically, the property of the monitored traffic comprises at least one of an amount of data moving between the plurality of microservices, a type of the data moving between the plurality of microservices, and a flow rate of the data moving between the plurality of microservices.

Step 320 comprises, based on the determined property of the monitored traffic, relocating each of the plurality of microservices from its respective origin resource to a shared resource.

In this embodiment, step 320 comprises steps 322 and 324. Step 322 comprises determining if the property of the monitored traffic satisfies a predetermined requirement. Step 324 comprises, responsive to the property of the monitored traffic satisfying the predetermined requirement, relocating each of the plurality of microservices from its respective origin resource to the shared resource.

By way of examples, the predetermined requirement comprises at least one of an amount of data being greater than or equal to a predetermined threshold, a type of the data being a predetermined type, and a flow rate of the data being greater than or equal to a predetermined threshold.

Step 320 comprises, for each of the plurality of microservices, restarting the microservice at the shared resource and shutting down the microservice at its origin resource.

In this embodiment, step 320 further comprises reconfiguring communication between the plurality of microservices by collecting the plurality of microservices from each of their respective origin resources to a shared resource.

In this embodiment, step 320 comprises, for each of the plurality of microservices, maintaining a first instance of the microservice at its origin resource, restarting a second instance of the microservice at the shared resource, and shutting down the second instance of the microservice at its origin resource. For example, multiple instances of the plurality of microservices are run in different modes. An instance of each of the plurality of microservices is relocated from its respective origin resource to a shared resource. In an example, a first instance of a first microservice and an instance of a second microservice are in the same process, however a second instance of the first microservice remains alone in a separate node to share the load of service requests from a third microservice. In another example, interactions between services are represented by routes. Route AB comprises a route from microservice A to microservice B and route CB comprises a route from microservice C to microservice B. In the example, route AB is heavily used (i.e. contains high levels of traffic) and route CB is not heavily used (i.e. contains low levels of traffic). In this scenario, a second instance of microservice B is restarted at a shared resource with microservice A and shut down at its origin resource. A first instance (i.e. an original instance) of microservice B is left (i.e. maintained) at its origin resource such that route CB is unaffected.

Here, at least one of the origin resources and the shared resource comprises a virtual resource.

By way of examples, the virtual resource comprises one of a node, a pod of a node, a container, a container of a pod, a process, and a process of a container. For example, two microservices on two separate nodes are shut down and restarted on a shared node. In another example, two microservices on the same node may be shut down and brought up inside a shared pod. In another example, two microservices in the same pod may be shut down and brought up in a shared container as two processes. In another example, two microservices in two separate processes may be shut down and brought up inside a shared process.

For example, the list of virtual resources disclosed above represent a series of abstractions with reduced latency as the resources are located closer to each other. In an example, communication between two microservices located on two separate nodes comprises network traffic between separate servers. In an example, communication between two microservices located on two separate containers comprises network traffic on a shared server. In an example, communication between two microservices located in two separate processes comprises inter-process calls. In an example, communication between two microservices located in a shared process comprises direct calls. The degree to which the microservices can be relocated depends on the infrastructure of the cloud environment and the microservice runtime (i.e. whether or not microservices comprise a managed, dynamic, or compiled runtime).

In another embodiment, the respective origin resource of each of the plurality of microservices comprises a shared origin resource of the plurality of microservices. In this example, the plurality of microservices were previously collapsed, and have now been expanded by relocating each of the plurality of microservices from their respective origin resources (i.e. the shared origin resource of the previously collapsed plurality of microservices) to a shared resource (i.e. a shared destination resource). For example, the shared resource comprises an origin resource of the plurality of microservices. As such, the plurality of microservices are distributed from an origin resource shared by the plurality of microservices to a shared resource that at least one of the plurality of microservices was previously located on.

Figure 4:
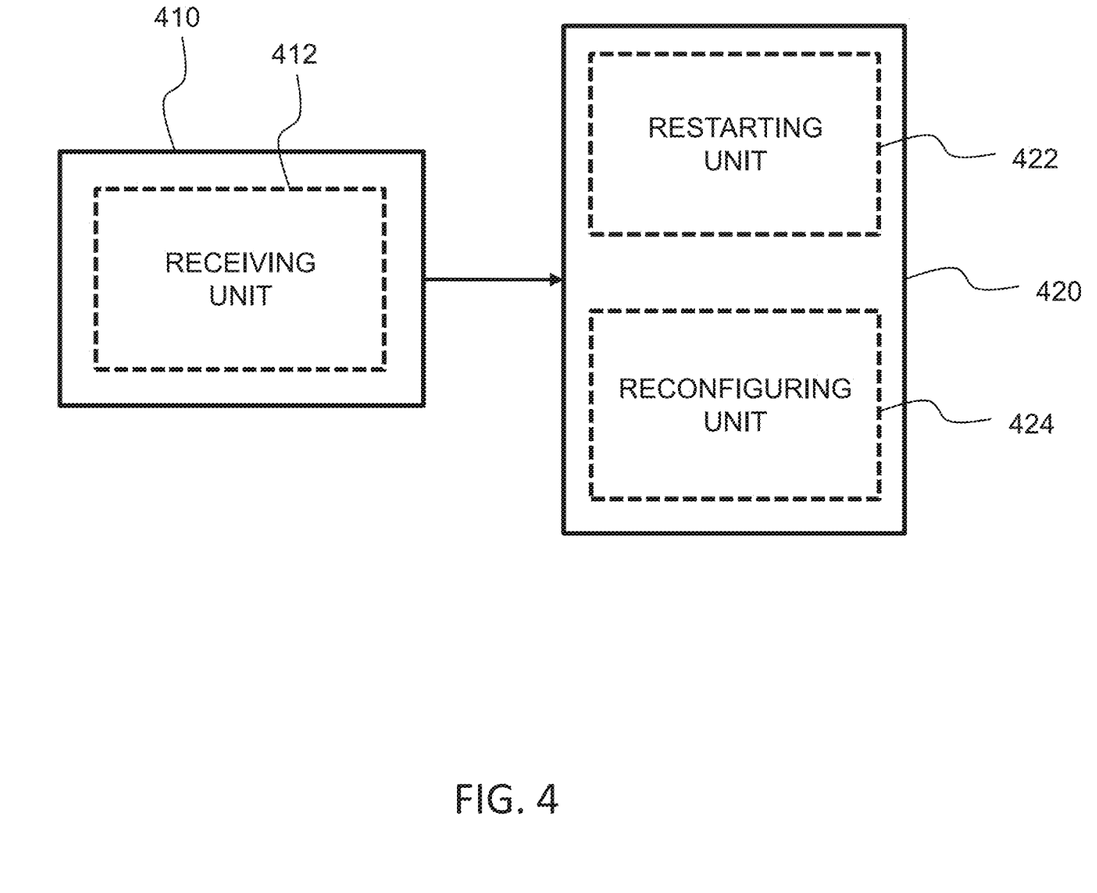
FIG. 4 is a simplified block diagram of an exemplary embodiment of a system for managing communication between a plurality of microservices, in accordance with an embodiment of the present invention.

Referring now to FIG. 4, there is depicted a simplified block diagram of an exemplary embodiment of a system for managing communication between a plurality of microservices.

The system comprises a monitoring unit 410 configured to monitor traffic between a plurality of microservices to determine a property of the traffic. The system further comprises a relocating unit 420 configured to, based on the determined property of the monitored traffic, relocate each of the plurality of microservices from its respective origin resource to a shared resource.

Here, the monitoring unit 410 comprises a receiving unit 412 configured to receive requests communicated between the microservices. The monitoring unit 410 is further configured to monitor traffic associated with the received requests.

By way of examples, the property of the monitored traffic comprises at least one of an amount of data moving between the plurality of microservices, a type of the data moving between the plurality of microservices, and a flow rate of the data moving between the plurality of microservices.

Here, the relocating unit 420 comprises a restarting unit 422 configured to for each of the plurality of microservices, restart the microservice at the shared resource and shut down the microservice at its origin resource.

The relocating unit 420 comprises a reconfiguring unit 424 configured to reconfigure communication between the plurality of microservices by collecting the plurality of microservices from each of their respective origin resources to a shared resource.

In this embodiment, the relocating unit 420 is further configured to determine if the property of the monitored traffic satisfies a predetermined requirement and, responsive to the property of the monitored traffic satisfying the predetermined requirement, relocate each of the plurality of microservices from its respective origin resource to the shared resource.

By way of examples, the predetermined requirement comprises at least one of an amount of data being greater than or equal to a predetermined threshold, a type of the data being a predetermined type, and a flow rate of the data being greater than or equal to a predetermined threshold.

In this embodiment, the restarting unit 422 is further configured, for each of the plurality of microservices, maintain a first instance of the microservice at its origin resource, restart a second instance of the microservice at the shared resource and shut down the second instance of the microservice at its origin resource.

Specifically, at least one of the origin resources and the shared resource comprises a virtual resource.

By way of examples, the virtual resource comprises one of a node, a pod of a node, a container, a container of a pod, a process, and a process of a container.

Referring now to FIGS. 5A-5E, there are depicted simplified block diagrams of examples of communication between a plurality of microservices.

In an example, Service A 520 and Service B 522 provide two different microservices within a distributed application in a container-orchestration system. Service A 520 frequently invokes Service B 522 over a published application programming interface (API), for example OpenAPI. Both Service A 520 and Service B 522 are implemented as applications in an open-source, cross-platform runtime environment. The applications are built into files comprising multiple layers used to execute code in a container, on a standard based operating system (OS) image, i.e. a file that contains the operating system, executable, and any data files that may be related to the programs on the operating system (e.g. a system image, a disk image, or a process image). Once built, the applications are then deployed as containers within pods in the container-orchestration system.

During development, Service A 520 is developed (i.e. generated) using application programming interfaces generated from the published application programming interface definition (e.g. OpenAPI definition) of Service B 522. In an embodiment, this is generated by way of a client-side scaffolding tool for web applications to create a package manager that can then be included in Service A 520 as a normal dependency. The generated code of Service A 520 handles calls from Service A 520 to Service B 522. The generated code determines the appropriate transport based on at least one of build time configuration parameters, deploy time configuration parameters, and runtime configuration parameters. For example, at build time, both Service A 520 and Service B 522 are packaged into the same container. For example, at deploy time, an instance of the container is started with a configuration parameter (e.g., an environment variable) that identifies for which services of Service A 520 and Service B 522 are to be started by the instance. For example, at runtime, instances of both Service A 520 and Service B 522 report their load to the monitoring unit 410.

Figure 5A:
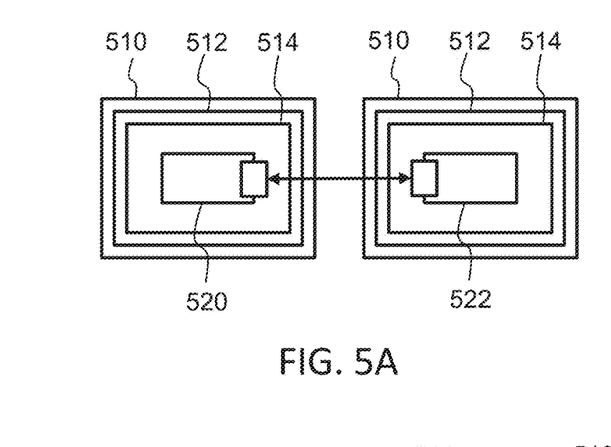
Figure 5B:
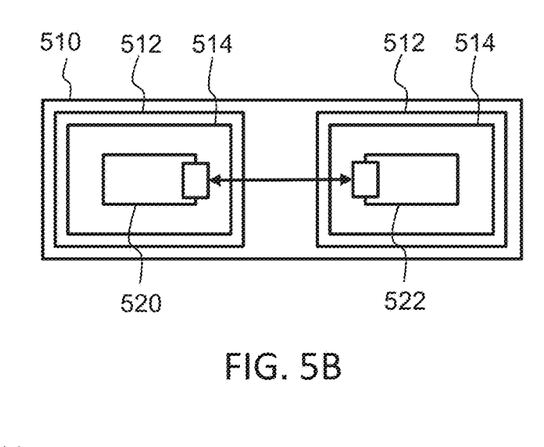
Figure 5C:
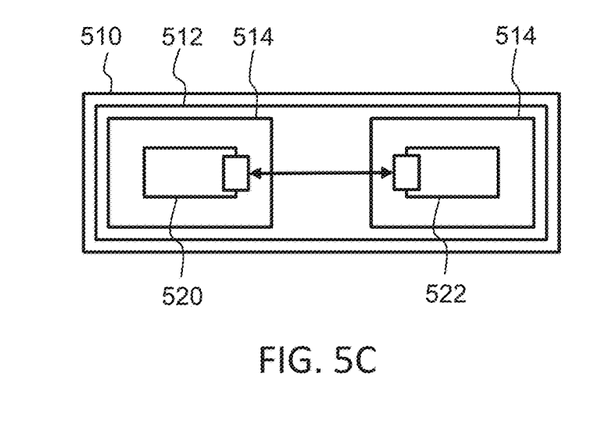
Figure 5D:
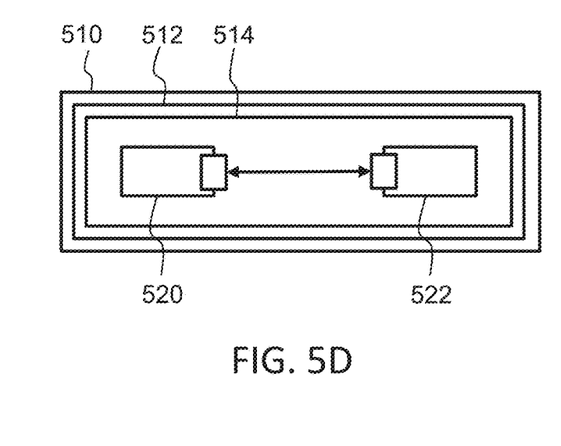
Figure 5E:
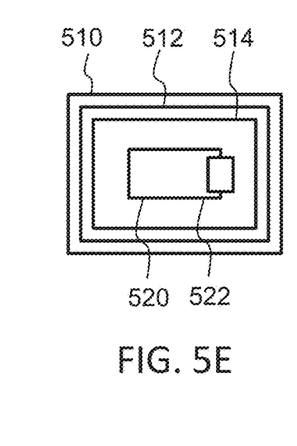

FIG. 5A depicts inter-node communication between Service A 520 and Service B 522. Service A 520 is in a first node 510 and Service B 522 is in a second node 510, such that the services are communicating between nodes 510. The Hypertext Transfer Protocol (HTTP) comprises marshalling, encrypting, networking, decrypting, then unmarshalling a message between Service A 520 and Service B 522. FIG. 5B depicts inter-pod communication (i.e. intra-node communication) between Service A 520 and Service B 522. Service A 520 is in a first pod 512 and Service B 522 is in a second pod 512, such that the services are communicating between pods 512. Both pods are within the same node 510. The Hypertext Transfer Protocol (HTTP) comprises marshalling, encrypting, decrypting, then unmarshalling a message between Service A 520 and Service B 522. FIG. 5C depicts inter-container communication (i.e. intra-pod communication) between Service A 520 and Service B 522. Service A 520 is in a first container 514 and Service B 522 is in a second container 514, such that the services are communicating between containers 514. Both containers 514 are within the same pod 512. The Hypertext Transfer Protocol (HTTP) comprises marshalling then unmarshalling a message between Service A 520 and Service B 522. FIG. 5D depicts inter-process communication (i.e. intra-container communication) between Service A 520 and Service B 522. Service A 520 is in a first process and Service B 522 is in a second process, such that the services are communicating between processes. Both processes are within the same container 514. The inter-process communication does not involve a Hypertext Transfer Protocol. FIG. 5E depicts an in-process function call between Service A 520 and Service B 522. Service A 520 and Service B 522 are in a shared process, such that the services are communicating within the shared process. The inter-process communication does not involve a Hypertext Transfer Protocol.

As load on the overall container-orchestration system changes, the way in which the Service A 520 and Service B communicate is changed (i.e. by way of the relocating unit 420). For example, the communication is changed from inter-pod communication using Transport Layer Security (TLS) (FIG. 5B) to intra-pod communication between containers without TLS (FIG. 5C). As a result, overhead required for encrypting and decrypting messages is no longer required and therefore saved.

In another example, individual containers are directed to start and stop their in-process instances of Service A 520 and Service B 522. Service A 520 and Service B 522 are packaged together within a shared container, therefore a running instance of Service A 520 can start its own instance of Service B 522, such that the API layer changes from making HTTP REST calls to real function calls (FIG. 5E).

In an example, the monitoring unit counts API calls and/or uses advanced known metrics such as profiling or other instrumentation to report processing overheads associated with the communication (i.e. monitoring traffic between a plurality of microservices to determine a property of the traffic). The relocating unit decides how to organize the services using heuristic techniques. For example, the relocating unit has rules on how many independent instances must be maintained for redundancy, whether to prioritize an overall response time or minimize a number of containers in use, in order to reduce billable memory charges. These techniques can be defined as different profiles, for example a development profile is defined that scales the number of containers in use to a minimum value to run on a local system of a software developer.

Figure 6:
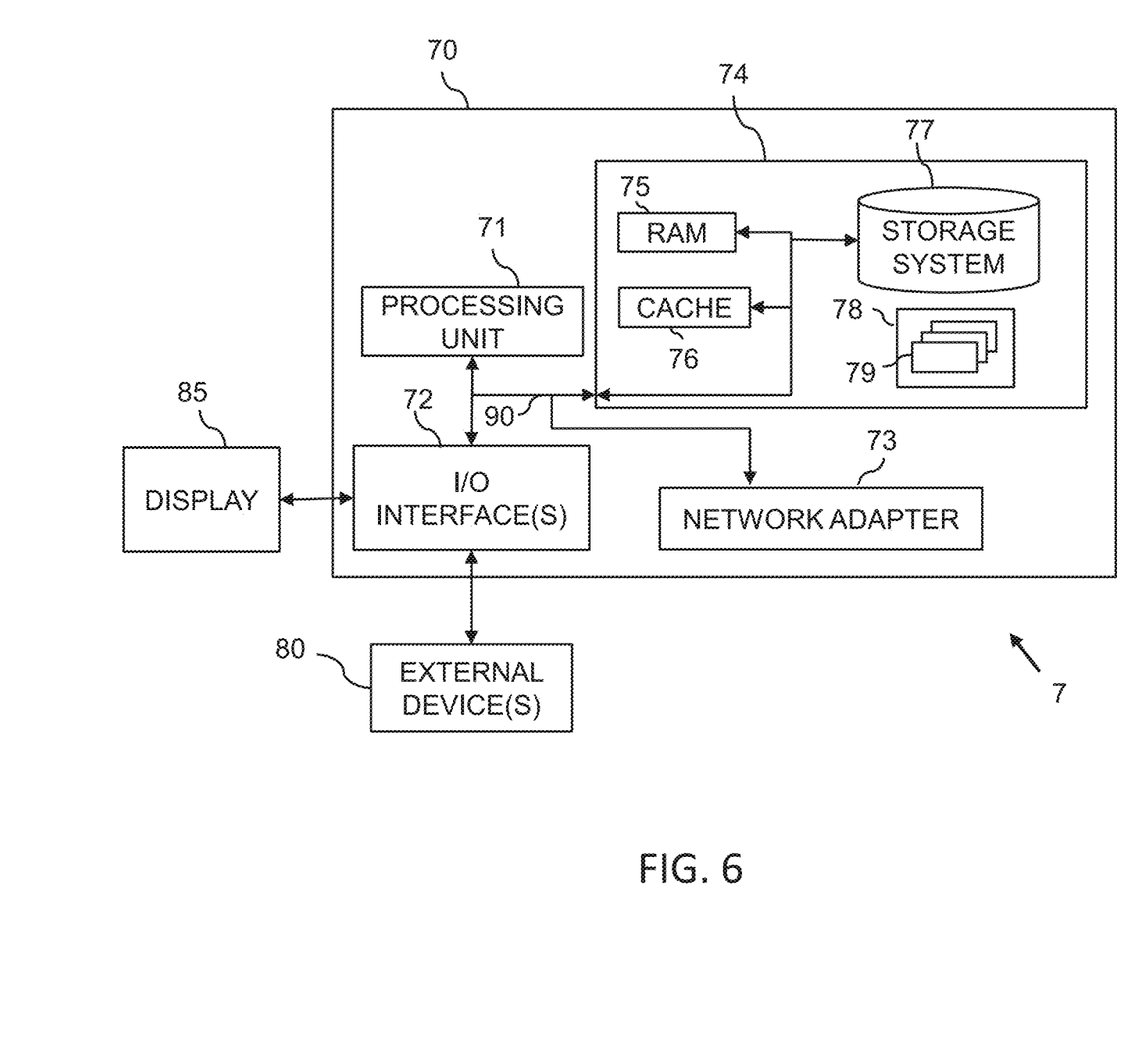
FIG. 6 is a block diagram of an example system, in accordance with an embodiment of the present invention.

By way of further example, as illustrated in FIG. 6, embodiments may comprise a computer system 70, which may form part of a networked system 7. For instance, a relocating unit may be implemented by the computer system 70. The components of computer system/server 70 may include, but are not limited to, one or more processing arrangements, for example comprising processors or processing units 71, a system memory 74, and a bus 90 that couples various system components including system memory 74 to processing unit 71.

System memory 74 can include computer system readable media in the form of volatile memory, such as random access memory (RAM) 75 and/or cache memory 76. Computer system/server 70 may further include other removable/non-removable, volatile/non-volatile computer system storage media. In such instances, each can be connected to bus 90 by one or more data media interfaces. The memory 74 may include at least one program product having a set (e.g., at least one) of program modules that are configured to carry out the functions of proposed embodiments. For instance, the memory 74 may include a computer program product having program executable by the processing unit 71 to cause the system to perform a method for managing communication between a plurality of microservices.

Program/utility 78, having a set (at least one) of program modules 79, may be stored in memory 74. Program modules 79 generally carry out the functions and/or methodologies of proposed embodiments for managing communication between a plurality of microservices.

Computer system/server 70 may also communicate with one or more external devices 80 such as a keyboard, a pointing device, a display 85, etc.; one or more devices that enable a user to interact with computer system/server 70; and/or any devices (e.g., network card, modem, etc.) that enable computer system/server 70 to communicate with one or more other computing devices. Such communication can occur via Input/Output (I/O) interfaces 72. Still yet, computer system/server 70 can communicate with one or more networks such as a local area network (LAN), a general wide area network (WAN), and/or a public network (e.g., the Internet) via network adapter 73 (e.g. to communicate recreated content to a system or user).

In the context of the present application, where embodiments of the present invention constitute a method, it should be understood that such a method is a process for execution by a computer, i.e. is a computer-implementable method. The various steps of the method therefore reflect various parts of a computer program, e.g. various parts of one or more algorithms.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a storage class memory (SCM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:
1. A computer-implemented method comprising:
 in response to receiving requests communicated between a plurality of microservices, determining a property of traffic by monitoring traffic between the plurality of microservices; and relocating each of the plurality of microservices temporarily from its respective origin resource to a shared resource based on the determined property of the monitored traffic.

2. The computer-implemented method of claim 1, wherein relocating each of the plurality of microservices comprises:
for each of the plurality of microservices, restarting the microservice at the shared resource and shutting down the microservice at its origin resource.

3. The computer-implemented method of claim 1, wherein relocating each of the plurality of microservices comprises:
reconfiguring communication between the plurality of microservices by collecting the plurality of microservices from each of their respective origin resources to the shared resource.

4. The computer-implemented method of claim 1, wherein the property of the monitored traffic comprises at least one of:
an amount of data moving between the plurality of microservices;
a type of the data moving between the plurality of microservices; and
a flow rate of the data moving between the plurality of microservices.

5. The computer-implemented method of claim 1, wherein at least one of the origin resource and the shared resource comprises a virtual resource.

6. The computer-implemented method of claim 5, wherein the virtual resource comprises one of:
a node;
a pod of a node;
a container;
a container of a pod;
a process; and
a process of a container.

7. The computer-implemented method of claim 1, wherein relocating each of the plurality of microservices comprises:
determining whether the property of the monitored traffic satisfies a predetermined requirement; and
responsive to the property of the monitored traffic satisfying the predetermined requirement, relocating each of the plurality of microservices from its respective origin resource to the shared resource.

8. The computer-implemented method of claim 7, wherein the predetermined requirement comprises at least one of:
an amount of data being greater than or equal to a predetermined threshold;
a type of the data being a predetermined type; and
a flow rate of the data being greater than or equal to a predetermined threshold.

9. The computer-implemented method of claim 1, wherein monitoring traffic between the plurality of microservices comprises:
receiving requests communicated between the plurality of microservices; and
monitoring traffic associated with the received requests.

10. The computer-implemented method of claim 1, wherein relocating each of the plurality of microservices comprises, for each of the plurality of microservices:
maintaining a first instance of the microservice at its origin resource;
restarting a second instance of the microservice at the shared resource; and
shutting down the second instance of the microservice at its respective origin resource.

11. A computer program product comprising:
one or more computer readable storage media and program instructions stored on the one or more computer readable storage media, the program instructions comprising:
program instructions to, in response to receiving requests communicated between a plurality of microservices, determine a property of traffic by to monitoring traffic between the plurality of microservices; and
program instructions to relocate each of the plurality of microservices temporarily from its respective origin resource to a shared resource based on the determined property of the monitored traffic.

12. The computer program product of claim 11, wherein the program instructions to relocating each of the plurality of microservices comprises:
for each of the plurality of microservices, program instructions to restart the microservice at the shared resource and shutting down the microservice at its origin resource.

13. The computer program product of claim 11, wherein the program instructions to relocate each of the plurality of microservices comprise:
program instructions to reconfigure communication between the plurality of microservices by collecting the plurality of microservices from each of their respective origin resources to the shared resource.

14. The computer program product of claim 11, wherein the program instructions to relocating each of the plurality of microservices comprise:
program instructions to determine whether the property of the monitored traffic satisfies a predetermined requirement; and
program instructions to, responsive to the property of the monitored traffic satisfying the predetermined requirement, relocate each of the plurality of microservices from its respective origin resource to the shared resource.

15. The computer program product of claim 11, wherein the program instructions to monitoring traffic between the plurality of microservices comprise:
program instructions to receive requests communicated between the plurality of microservices; and
program instructions to monitor traffic associated with the received requests.

16. The computer program product of claim 11, wherein the program instructions to relocating each of the plurality of microservices comprises, for each of the plurality of microservices comprise:
program instructions to maintain a first instance of the microservice at its origin resource;
program instructions to restart a second instance of the microservice at the shared resource; and
program instructions to shut down the second instance of the microservice at its respective origin resource.

17. A computer system for comprising:
one or more computer processors;
one or more computer readable storage media; and
program instructions stored on the one or more computer readable storage media for execution by at least one of the one or more computer processors, the program instructions comprising:
program instructions to, in response to receiving requests communicated between a plurality of microservices, determine a property of traffic by to monitoring traffic between the plurality of microservices; and program instructions to relocate each of the plurality of microservices temporarily from its respective origin resource to a shared resource based on the determined property of the monitored traffic.

18. The computer system of claim 17, wherein the program instructions to relocating each of the plurality of microservices comprises:

for each of the plurality of microservices, program instructions to restart the microservice at the shared resource and shutting down the microservice at its origin resource.

19. The computer system of claim 17, wherein the program instructions to relocate each of the plurality of microservices comprise:

program instructions to reconfigure communication between the plurality of microservices by collecting the plurality of microservices from each of their respective origin resources to the shared resource.

20. The computer system of claim 17, wherein the program instructions to relocating each of the plurality of microservices comprise:

program instructions to determine whether the property of the monitored traffic satisfies a predetermined requirement; and program instructions to, responsive to the property of the monitored traffic satisfying the predetermined requirement, relocate each of the plurality of microservices from its respective origin resource to the shared resource.

* * * * *